Sept. 9, 1941.  J. W. MARDEN ET AL  2,255,431
MOLDED FLUORESCENT LAMP
Filed Oct. 21, 1939   2 Sheets-Sheet 1
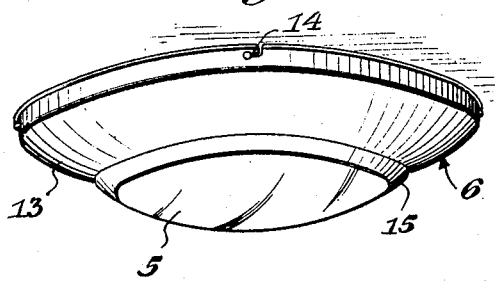
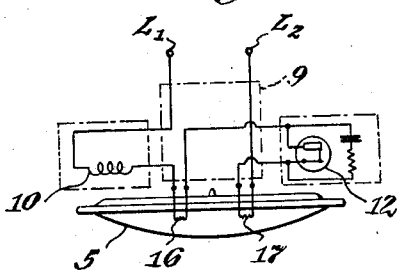
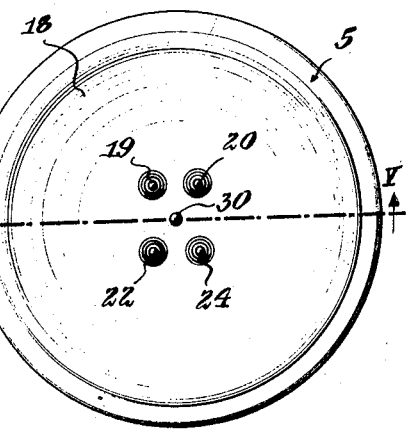
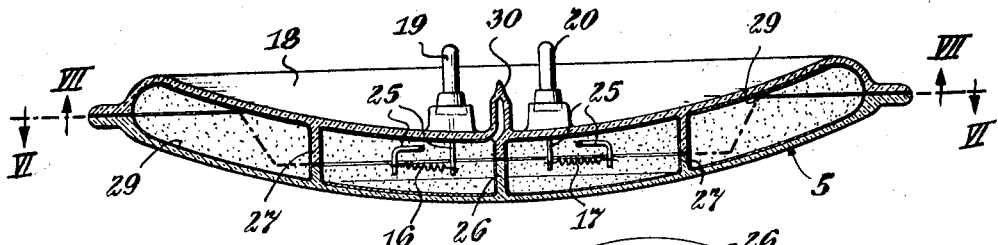
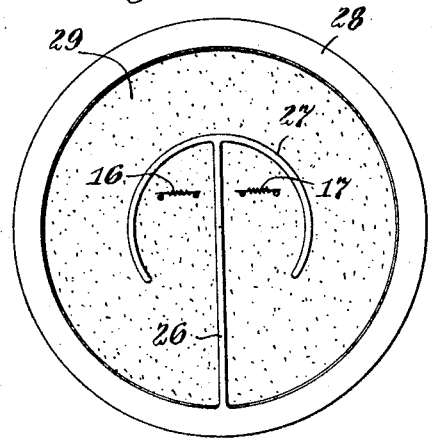
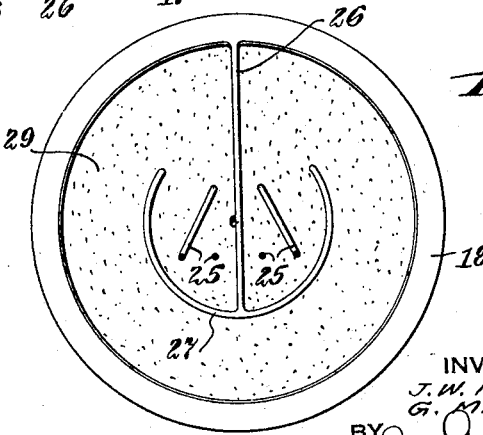
INVENTOR
J. W. MARDEN
G. MEISTER
BY
ATTORNEY

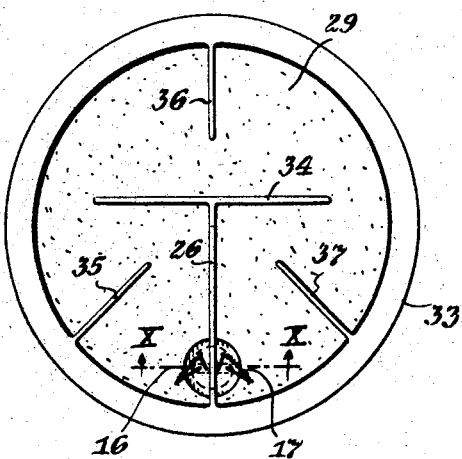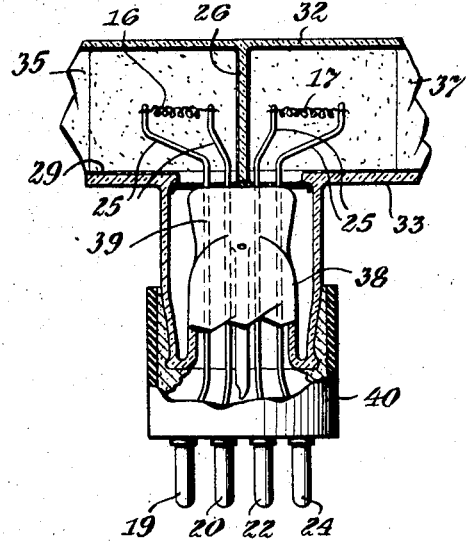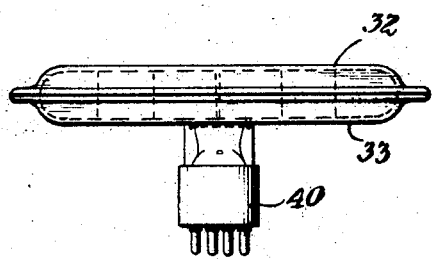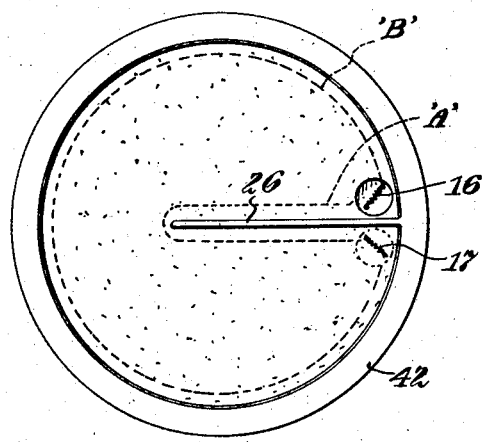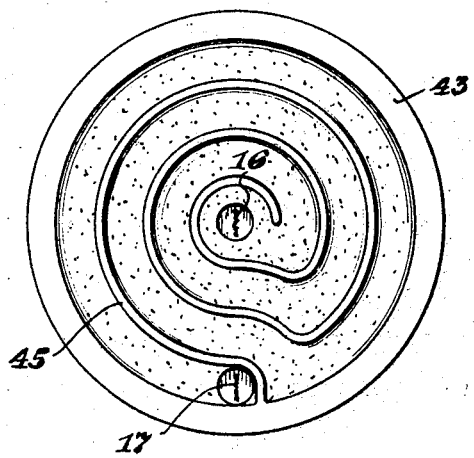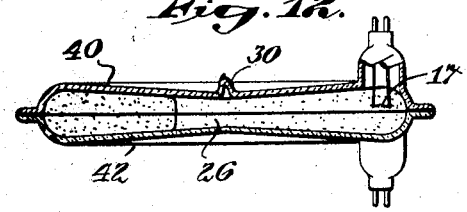

Patented Sept. 9, 1941

2,255,431

UNITED STATES PATENT OFFICE 2,255,431

MOLDED FLUORESCENT LAMP

John W. Marden, East Orange, and George Meister, Newark, N. J., assignors to Westinghouse Electric & Manufacturing Company, East Pittsburgh, Pa., a corporation of Pennsylvania Application October 21, 1939, Serial No. 300,542

1 Claim. (Cl. 176—122)

The present invention relates to discharge lamps and more particularly to what are known to the art as fluorescent lamps.

Lamps of this type are now in commercial use and have heretofore comprised a tubular envelope having electrodes therein between which a discharge occurs in a gaseous atmosphere. Due to the gaseous filling, invisible ultra-violet radiations are produced and in order to convert these invisible radiations into visible light, the interior of the envelope is provided with a coating which fluoresces under the action of the invisible ultra-violet.

Although the efficiency of such fluorescent lamps in lumens per watt is several times that of an incandescent lamp of the same wattage, the total efficiency of the fluorescent lamp is naturally dependent upon the surface area having the fluorescent coating from which the visible light emanates, particularly since the amount of visible light generated by the gaseous discharge is inappreciable. Since these lamps have heretofore been of tubular shape, the coated surface area has been necessarily restricted, which has limited the total lumen output. Moreover, a further disadvantage has resided in the fact that such tubular fluorescent lamps are not readily adaptable to present domestic and commercial type fixtures, but require special fixtures which are not very pleasing in an aesthetic sense.

It is accordingly an object of the present invention to provide a concentrated light source of high efficiency.

Another object of the present invention is the provision of a fluorescent lamp having a relatively large surface area to increase the total visible radiations attainable.

Another object of the present invention is the provision of a fluorescent lamp of relatively large area which has a higher luminous efficiency for a given wattage than has heretofore been attainable with such lamps at the same wattage.

Another object of the present invention is the provision of a fluorescent lamp which is readily adaptable to various type fixtures as utilized for domestic and commercial purposes.

Another object of the present invention is the provision of a fluorescent lamp which can be very readily and economically manufactured.

A further object of the present invention is the provision of a fluorescent lamp constructed of two flat plates or discs sealed together and coated with a fluorescent material to form a discharge chamber and wherein the cross-sectional area of the chamber is so proportioned relative to the pressure of the gaseous medium therein that a diffused discharge occurs between the electrodes for substantially uniformly exciting the entire coated surface area of the lamp.

Still further objects of the present invention will become obvious to those skilled in the art by reference to the accompanying drawings wherein:

Fig. 1 is a perspective view of one type of ceiling fixture which may be employed for supporting a fluorescent lamp of the present invention;

Fig. 2 is a cross-sectional view of the fixture as shown in Fig. 1 with the fluorescent lamp of the present invention in position within the fixture;

Fig. 3 is a diagrammatic illustration of the circuit and auxiliary starting equipment employed in connection with the fluorescent lamp of the present invention;

Fig. 4 is a rear plan view showing the fluorescent lamp of Figs. 1 and 2 wherein the same is of curvilinear configuration;

Fig. 5 is a cross-sectional view taken on the line V—V of Fig. 4;

Fig. 6 is a plan view of the lower molded portion of the fluorescent lamp of the preceding figures as viewed from the sectional line VI—VI of Fig. 5;

Fig. 7 is a plan view of the upper molded portion of the same lamp and as viewed on the sectional line VII—VII of Fig. 5;

Fig. 8 is a plan view similar to Fig. 6 of a molded portion of a modification which the fluorescent lamp of the present invention may take;

Fig. 9 is an elevational view of the modification of Fig. 8;

Fig. 10 is a fragmentary sectional view taken on the line X—X of Fig. 8;

Fig. 11 is a plan view of a molded section of another modification;

Fig. 12 is a cross-sectional view of the completed fluorescent lamp as shown in Fig. 11;

Fig. 13 is a plan view of a molded section of a still further modification which the fluorescent lamp of the present invention may take, and Fig. 14 is a cross-sectional view of the completed lamp of the modification such as partially shown in Fig. 13.

Referring now to the drawings in detail, a fluorescent lamp 5 is shown in Fig. 1 which may be supported by any suitable type fixture 6, aesthetically comparable to those at present employed for incandescent lamps and adapted to be mounted from the customary ceiling outlet box 7 (Fig. 2). As shown more in detail in Fig. 2, the fixture 6 comprises a base member 8 secured to the outlet box 7 which is provided with a socket 9 and supports a reactance element 10 and a glow relay unit 12. An annular portion 13 engages the base portion 8 by any suitable arrangement, such as a bayonet clutch connection 14, and this annular portion 13 is provided with an annular ledge 15 about the periphery of its opening which supports the circular or disc type lamp 5, as hereinafter more fully described, having its terminals connected to the socket 9.

Although the electrical circuit for energizing the lamp and the glow relay unit 12 per se forms no part of the present invention, such is shown in Fig. 3. From this figure it will be noted that the socket 9 is so formed that one end of the reactance 10 is connected to one side of the source of supply L1, while the remaining end of the reactance is connected to one end of a filamentary electrode 16 of the lamp 5. One end of the other filamentary electrode 17 is connected directly to the other side of the line L2 and the filamentary electrodes 16 and 17 are connected in series through the medium of the glow relay unit 12, which latter includes a glow relay tube having a bimetallic electrode together with a parallel connected capacitance and series resistance.

Upon closure of the main line switch (not shown) a discharge occurs between the electrodes of the glow relay tube which heats the bimetallic electrode and causes it to engage the other electrode, thus connecting the filamentary electrodes 16 and 17 in series with the source L1—L2. After cooling of the bimetallic electrode of the glow relay tube and disengagement thereof with the remaining electrode, the reactance element 10 causes a high voltage "kick" which initiates a discharge between the electrodes 16 and 17 and the glow relay unit thereafter consumes no energy from the source. The operation of the circuit is thus identical to that at present employed with fluorescent lamps which are of tubular configuration.

In order to increase the efficiency and total light output of a fluorescent lamp of any given wattage, the present invention contemplates making the lamp of disc shape so as to increase the total area of the available fluorescent coating for a lamp of any selected wattage. Also, for the purpose of facilitating fabrication of the lamp, it is made in two molded portions fused or otherwise hermetically sealed together to form the discharge chamber.

In Figs. 1 to 7, for example, the lamp 5 is constructed of a molded upper portion 18 having its outer wall concave and provided with electrode terminals 19, 20, 22, and 24 sealed therein to which is secured the leading-in and supporting conductors 25 for the electrodes 16 and 17. This upper portion 18 is also provided with a radially extending partition 26 of slightly greater length than the radius of the disc-shaped portion and which separates the filamentary electrodes 16 and 17. At the free end of the radially extending partition 26, it is joined to an arcuate partition 27 of about 300° having its axis coinciding with that of the molded portion 18, as can be appreciated from Fig. 7.

The lower portion 28 is identical to the upper portion 18 as far as size and partitions are concerned, as can be seen in Fig. 6, but differs therefrom in that the outer wall of the lower portion 28 is convex and naturally need not be provided with electrodes. The two sections 18 and 28 are then coated on their inner surface with a coating of material 29 which fluoresces under excitation by ultra-violet, such as magnesium tungstate, calcium tungstate, cadmium or zinc silicate, depending upon the particular color of the light desired, although magnesium tungstate is most frequently used since it produces a white color.

When the lower convex portion 28, as shown in Fig. 6, is inverted and placed on the upper concave portion 18, the lamp 5 such as shown in Fig. 6 is thus formed, since the periphery of both portions as well as the partitions 26 and 27 coincide. These two portions are then sealed about the periphery, such as by heating to a temperature sufficient to cause fusion or by a suitable hermetically seal-forming cement, such as silver chloride or the like. The abutting partitions join sufficiently without the necessity of fusion or cementing to form a discharge chamber for the lamp 5, which for a 20 watt lamp is approximately six inches in diameter with a wall spacing of from about three-quarters to one inch. The lamp is then exhausted and prior to sealing off at the tip 30, a small quantity of mercury, together with an inert gas, is introduced into the chamber at a pressure ranging from 1 to several millimeters.

Animated discharge lamps formed of molded parts are known in the art, but in such devices the resulting discharge follows a plurality of parallel paths. In the lamp of the present invention the discharge is not only prevented from following parallel paths, but is also prevented from following the shortest path between the electrodes. For example, the lamp as shown in Fig. 5 is provided with the electrodes 16 and 17 which are substantially in the center of the disc envelope so as to facilitate insertion of the electrode terminals in a socket and thus centralize the lamp with a fixture as shown in Fig. 1.

Although the electrodes 16 and 17 are thus in close proximity to each other, the partitions 26 and 27 prevent the discharge from taking the shortest path between the electrodes. In other words, the length of the discharge path in the lamp as shown in Figs. 1 to 7 and in the absence of both partitions would be confined to the center of the envelope and between the closely spaced electrodes. With only the partition 26, the discharge path is thus lengthened into a circuitous one, but since the shortest path would be along each side of this partition, it would result in only a radial configuration so that the fluorescent coating 29 is not excited over its entire area. By providing the partition 27 the discharge again follows a longer circuitous path between the electrodes which is thus sufficiently diffused as to uniformly excite the entire coated area of the disc envelope, producing a lamp of high luminous efficiency.

Moreover, due to the fact that the spacing between plates, or walls of the discharge chamber, regulates the voltage drop per unit length of the discharge and since the partitions cause the discharge to take a long circuitous path, the spacing between walls are so proportioned that the total voltage drop is maintained approximately at 65 volts or other desirable voltage. With filamentary electrodes of the type shown, the voltage drop at the electrodes is about 12 to 15 volts so that the drop in the discharge is 50 volts or more. This gives a substantial portion of the total energy in the discharge itself and results in a very efficient lamp. For lamps of higher or lower voltages, the spacings of the walls are varied, which alters the gradient in various portions of the lamp and changes the total voltage drop in the discharge, the voltage drop at the electrodes remaining constant.

Although the disc type lamp of the present invention operates satisfactorily with mercury vapor alone as the ionizable medium if high enough voltage is available for starting, and a diffused discharge results which may uniformly excite the fluorescent coating, the average life of such lamps is only about five hundred hours, making them inferior to the tubular type fluorescent lamps so far as commercially useful life is concerned. However, by the addition of an inert gas such as argon, neon, helium, or the like, at from one to several millimeters pressure, not only does the inert gas facilitate starting of the lamp, but it also increases the longevity of the disc type lamp so that it is comparable to the tubular fluorescent lamp having a commercially useful life of approximately two thousand hours.

In Figs. 8 to 10 a slightly different modification is shown in that the two molded portions 32 and 33 are both flat instead of concave and convex, respectively, as shown in the previous embodiment. Also, the radially extending partition 26 is joined to a partition 34 disposed at right angles thereto instead of the arcuate partition 27, and a plurality of partitions 35, 36 and 37 project from the periphery of the chamber toward the axis of the lamp. In this modification the filamentary electrodes 16 and 17 are positioned near the circumference of the chamber, but again the discharge is diffused and follows a circuitous path so as to uniformly excite the entire area of the coated fluorescent material 29. One of the molded portions 33 is provided with a reentrant portion 38 having a press 39 through which the leading-in and supporting conductors 25 extend. Instead of providing terminals on the molded portion, as in the previously described embodiment, the lamp 5 is shown in Fig. 10 provided with a suitable insulated base 40 carrying the terminals 19, 20, 22, and 24.

Referring now more particularly to Figs. 11 and 12, it will be noted that the filamentary electrodes 16 and 17 are again disposed near the circumference of the discharge chamber as in Fig. 8, but one electrode is provided in each molded portion 40 and 42 so that both portions are identical and may be cast in a single mold. Also, only the one radial partition 26 is provided in this particular modification. As previously mentioned, this would normally cause the discharge to extend along each side of the partition 26 since such is the shortest operable path for the discharge. This is due to the fact that since the voltage drop increases with increase in the length of the discharge path, the voltage is insufficient to cause a diffused discharge when the walls of the discharge chamber are equally spaced from each other.

To render the voltage drop uniform, regardless of the varying length of the discharge when diffused through a circular chamber, the opposite walls are constricted toward the center of the lamp chamber, as shown more clearly in Fig. 12, since, as above mentioned, the voltage drop is controlled by the wall spacing. For example, assuming there are a plurality of discharge paths, then the discharge path "A" of Fig. 11 is much shorter than that of the discharge path "B," and in order to make the voltage drop of the shortest discharge path "A" equal to that of the longest discharge path "B," the walls are more constricted or spaced a lesser distance apart over the shortest discharge path "A."

Moreover, since the length of the discharge paths graduate from the longest to the shortest with a gradual graduation in voltage drop, the discharge chamber is likewise graduated in its constriction from maximum at the area of longest discharge path to minimum at the area of shortest discharge path.

Such construction thus causes the proper mercury pressure as there are no "cold" pockets which would cause condensation of the mercury vapor with a variation in its pressure, and the voltage drop throughout the discharge chamber is likewise maintained uniform. Since there is actually only a single discharge instead of a plurality of paths, which single path is diffused through the discharge chamber, the light distribution is accordingly uniform as the entire coated surface of the lamp is thus excited as in the previous modifications.

A slightly different modification is shown in Figs. 13 and 14 wherein each molded portion 43 and 44 is provided with a spiral partition 45 with one filamentary electrode 16 disposed in the center of the discharge chamber while the other filamentary electrode 17 is positioned at the periphery. When the two molded portions are joined together, as shown in Fig. 14, a spiral-like lamp is formed wherein the single discharge follows a spiral path covering the entire coated area of the lamp.

It thus becomes obvious to those skilled in the art that the new design of disc-type fluorescent lamp as herein described allows the production of lamps of much greater area and much greater concentrated light output. The largest tubular fluorescent lamp now made is four feet long and one and one-half inches in diameter, consuming 40 watts. This gives a total light output of 1400 lumens. In customary overhead or ceiling fixtures considerably higher lumen output is required. A 200 watt incandescent filament lamp gives a total of 3500 lumens. A disc-type white light fluorescent lamp giving 3500 lumens output is only fourteen inches in diameter consuming only about 100 watts.

In order to get the same amount of lumens from present tubular type fluorescent lamps, two forty-watt lamps of four foot length and one twenty-watt lamp twenty-four inches long are required, making a total of ten feet of fluorescent tubing which must be carried by a long fixture to accommodate the four-foot tubes. Also, three sets of auxiliary equipment would be required for the tubular lamps which makes the cost of installation excessive when compared with a single disc-type fluorescent lamp with its unitary auxiliary equipment.

Aside from the cost and cumbersomeness of such extenuated sources, it is impossible to concentrate the light therefrom, so that it is difficult if not impossible to get highly illuminated surfaces with tubular type fluorescent lamps. Due to favorable shape, the size of the disc-type fluorescent lamp may be varied widely for a given wattage lamp with the resulting increase in efficiency due to large surface area. Also the high wattage tubular fluorescent lamps, such as the 40 watt tubular lamp which operates at 108 volts, require special transformers for operation since about 65 or 70 volts is the highest alternating current voltage available for operation from the customary domestic source of 115 volts.

Longer and higher wattage tubular fluorescent lamps require still higher voltages. These higher voltages, and the consequent danger attendant such voltages, are avoided by the disc-type fluorescent lamps, where special transformers for higher voltage are not required, since relatively low voltage disc-type fluorescent lamps can be made regardless of wattage.

The following tabulation will serve to illustrate the comparable sizes between tubular and disc-type fluorescent lamps:

| Wattage | Tubular lamps | | Disc lamps, approx. diameter |
|---|---|---|---|
| | Length | Diameter | |
| | Inches | Inches | Inches |
| 15 | 18 | 1 | 5 |
| 20 | 24 | 1½ | 6+ |
| 30 | 36 | 1 | 8 |
| 40 | 48 | 1½ | 9 |
| 70 | No such sizes made | | 12 |
| 110 | No such sizes made | | 15 |
| 160 | No such sizes made | | 18 |

Moreover, with the various wattage disc-type fluorescent lamps, by proper spacing of the envelope walls, the voltage drop can be controlled so that such lamps can be made to operate for any desired voltage source and particularly at domestic potentials of 110 or 220 volts. Due to the increase in total light which is uniformly distributed from the disc-type fluorescent lamp of the present invention, it can readily be used with existing type commercial and domestic fixtures as well as in table and floor lamp stands commonly found in the home. Inasmuch as the lamp is formed of molded parts, it can be readily and economically manufactured and because of the decreased cost of installation to get adequate light from a single simple installation, operation of this type lamp will result in considerable savings to the consumer.

It can also be readily appreciated that despite the fact a disc-type fluorescent lamp of high efficiency which produces a concentrated light has been herein shown and described, such lamp finds ready application in the sign lighting field. Because of the concentration of the light from a single lamp, an ideal sign lamp can be readily made by disposing indicia on the flat surface of the disc-type lamp or it may be made of rectangular shape. In addition, the fluorescent coating may be applied in a desired configuration so as to display any desired pattern or lettering. Also, the desired design may be molded into the lamp or a configuration in the form of a partition and coated with fluorescent material, placed in the discharge chamber prior to joining the molded portions of the envelope.

Although several embodiments of the present invention have been shown and described, it is to be understood that still further modifications of the same may be made without departing from the spirit and scope of the appended claim.

What is claimed:

A fluorescent lamp comprising a disc-shaped envelope formed of coinciding molded portions hermetically sealed together to provide a discharge chamber of relatively large area and closely spaced walls, a coating of fluorescent material on the walls of said envelope, an ionizable medium in said discharge chamber, a pair of electrodes disposed in said discharge chamber between which a diffused discharge occurs with attendant uniform excitation of said fluorescent coating upon the application of a potential thereto, a partition in said discharge chamber to increase the length of the discharge path between said electrodes to a predetermined minimum, and the walls of said discharge chamber converging in the direction of the axis of said disc-shaped envelope to render the voltage drop of the shortest actual discharge path the same as that of the remaining longer paths of varying lengths to cause the voltage drop of the entire diffused discharge to be uniform throughout said discharge chamber.

JOHN W. MARDEN.
GEORGE MEISTER.